No. 625,026. Patented May 16, 1899.
H. B. EARECKSON.
NUT LOCK.
(Application filed Nov. 11, 1898.)
(No Model.)
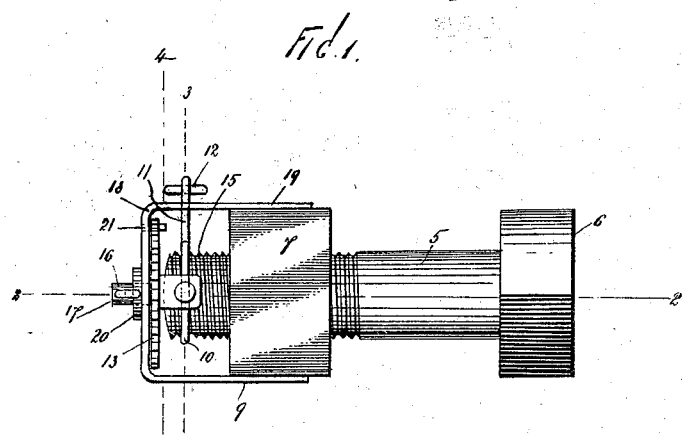
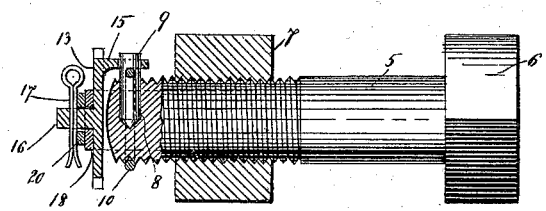
 
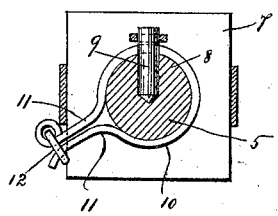 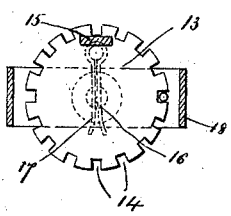
WITNESS
John Buckler,
F. A. Stewart
INVENTOR
Henry B. Eareckson
BY
Edgar Tate & Co.
ATTORNEYS
THE NORRIS PETERS CO., PHOTO-LITHO., WASHINGTON, D. C.

UNITED STATES PATENT OFFICE.

HENRY B. EARECKSON, OF NEW YORK, N. Y.

NUT-LOCK.

SPECIFICATION forming part of Letters Patent No. 625,026, dated May 16, 1899.

Application filed November 11, 1898. Serial No. 696,137. (No model.)

*To all whom it may concern:*

Be it known that I, HENRY B. EARECKSON, a citizen of the United States, residing at New York, in the county of New York and State of New York, have invented certain new and useful Improvements in Nut-Locks, of which the following is a full and complete specification, such as will enable those skilled in the art to which it appertains to make and use the same.

This invention relates to nut-locks; and the object thereof is to provide an improved device of this class which may be employed wherever nut-locks are required and which is adapted to serve as a lock to prevent the turning of a nut when the latter is once screwed into place.

The invention is fully disclosed in the following specification, of which the accompanying drawings form a part, in which—

Figure 1 is a plan view of a bolt provided with a nut and my improved nut-lock; Fig. 2, a partial section on the line 2 2 of Fig. 1; Fig. 3, a partial section on the line 3 3 of Fig. 1, and Fig. 4 a section on the line 4 4 of Fig. 1.

In the drawings forming part of this specification the separate parts of my improvement are designated by the same numerals of reference in each of the views, and in said drawings I have shown at 5 an ordinary screw-threaded bolt provided with a head 6 and a nut 7.

The bolt 5 is provided adjacent to the end thereof with a radial pin-hole 8, in which is mounted a pin 9, and passing through the upper portion of said pin 9 and encircling the screw-threaded bolt 5 is a clamp 10, which is open at one side and provided with two similar jaws 11, which are connected by a link 12. The object of the link 12 is to hold the clamp 10 securely on the bolt 5, and the object of the clamp 10 is to hold the pin 9 in the bolt, as shown in Fig. 3. I also provide a disk 13, having notches or recesses 14 in the perimeter thereof and provided at its upper edge with an angular projecting arm 15, which is provided with an opening through which the upper end of the pin 9 passes, and said disk is also provided centrally of its outer side with a projection 16, through which is passed an ordinary key-pin 17.

The yoke-shaped frame 18 is mounted on the projection 16 of the disk 13 and provided with parallel arms 19, which project in the direction of the head 6 of the bolt 5 and overlap the sides of the nut 7, and between the yoke-shaped frame 18 and the key-pin 17 is ordinarily placed a washer 20.

When the separate parts of my improved lock are connected in the manner described, it will be apparent that the nut 7 cannot be turned, and it will also be apparent that the washer 20 is not absolutely essential, as the necessity for the use of said washer will depend upon the length of the projection 16 of the disk 13, on which the yoke-shaped frame 18 is mounted. The yoke-shaped frame 18 is also provided with an inwardly-directed pin 21, which is adapted to enter the notches or recesses 14 in the perimeter of the disk 13, and the object of this pin is to prevent the yoke-shaped frame 18 from turning, the said disk 13 being prevented from turning by means of its connection with the pin 9.

This device is simple in construction and operation and perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. The combination with a bolt provided with a nut and a radial pin-hole adjacent to the end thereof, of a nut-lock comprising a pin which is inserted into said pin-hole, a clamp connected with said pin and encircling the bolt, a disk mounted adjacent to the end of the bolt and provided with an arm through which said pin passes, said disk being provided with notches or recesses in its perimeter and with a central projection on its outer side, and a yoke-shaped frame mounted on said central projection and the sides of which are adapted to overlap the sides of the nut, said frame being also provided with an inwardly-directed pin which is adapted to enter the notches or recesses in the perimeter of said disk, substantially as shown and described.

2. A nut-lock comprising a pin which is adapted to be inserted into a radial pin-hole formed in the bolt adjacent to the end thereof, a clamp for securing said pin to said bolt, a disk mounted adjacent to the end of the bolt and connected with said pin, and a yoke-shaped frame connected with said disk and having arms which project parallel with the sides of the nut, substantially as shown and described.

3. A bolt, provided with a nut and a radial pin-hole adjacent to the end thereof, and a nut-lock comprising a pin which is adapted to be inserted into said hole, a clamp passing through the end of said pin and encircling said bolt, a disk mounted adjacent to the end of said bolt and provided with an arm through which said pin passes, and centrally of its outer side with a projection, and a yoke-shaped frame mounted on said projection and provided with parallel arms which are adapted to overlap the sides of the nut, substantially as shown and described.

4. A nut-lock, comprising a pin 9 which is adapted to be inserted radially into the end of a bolt, a clamp 10 connected with said pin and encircling said bolt, a disk 13 mounted adjacent to the end of said bolt and provided with an arm through which said pin passes, said disk being also provided centrally of its outer side with a projection, a yoke-shaped frame 18 mounted on said projection and provided with parallel arms 19, said yoke-shaped frame being adapted to be connected with said disk, substantially as shown and described.

5. The combination with a bolt provided with a nut and a radial pin-hole adjacent to the end thereof, of a nut-lock comprising a pin which is adapted to be inserted into said pin-hole, a clamp which passes through said pin and encircles said bolt, a disk mounted adjacent to the end of the bolt and provided with an arm through which said pin passes, and a yoke-shaped frame connected with said disk and provided with arms which overlap the sides of the nut, substantially as shown and described.

6. The combination with a bolt provided near the end thereof with a radial pin-hole, of a nut-lock comprising a pin which is adapted to be inserted into said pin-hole, means for securing said pin in said pin-hole, a disk mounted adjacent to the end of the bolt and provided with an arm through which said pin passes, and centrally of the outer side thereof with a projection, and a yoke-shaped frame mounted on said projection and provided with arms which project parallel with the bolt, said disk being provided with notches or recesses in the perimeter thereof and said frame with a pin which is adapted to enter said notches or recesses, substantially as shown and described.

7. A bolt provided with a radial pin-hole adjacent to the end thereof, a nut mounted on the end of said bolt, and a nut-lock comprising a pin which is adapted to be inserted into said pin-hole, means for securing said pin in the bolt, a disk mounted adjacent to the end of the bolt and connected with said pin, and a yoke-shaped frame connected with said disk and having parallel sides which inclose said nut, substantially as shown and described.

In testimony that I claim the foregoing as my invention I have signed my name, in presence of the subscribing witnesses, this 9th day of November, 1898.

HENRY B. EARECKSON.

Witnesses:
   F. A. STEWART,
   C. C. OLSEN.